Oct. 23, 1928.

L. P. HUTT 1,688,715

MOTOR CONTROL MECHANISM

Original Filed Dec. 19, 1924    3 Sheets-Sheet 1

Inventor:
Leonard P. Hutt,
by *Alexander S. Lunt*
His Attorney.

Oct. 23, 1928.

L. P. HUTT

MOTOR CONTROL MECHANISM

Original Filed Dec. 19, 1924  3 Sheets-Sheet 2

Inventor:
Leonard P. Hutt,
by
His Attorney.

Oct. 23, 1928.
L. P. HUTT
MOTOR CONTROL MECHANISM
Original Filed Dec. 19, 1924   3 Sheets-Sheet 3
1,688,715
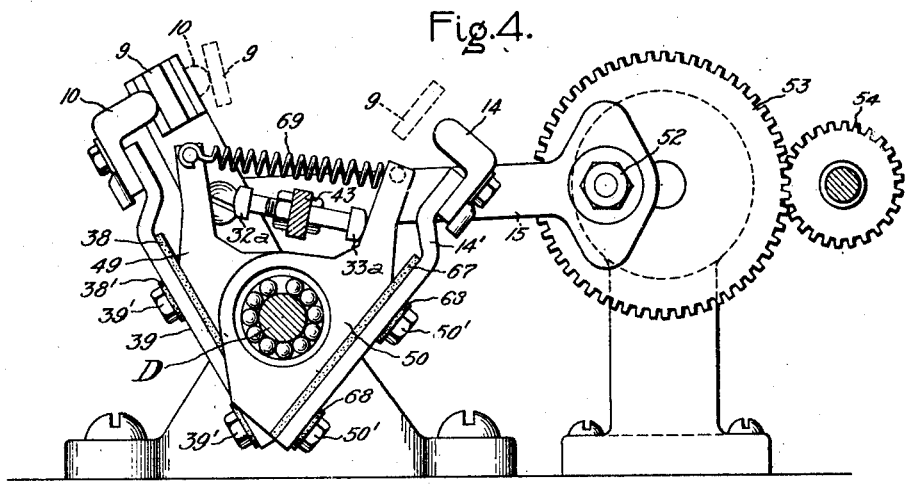
Fig.4.
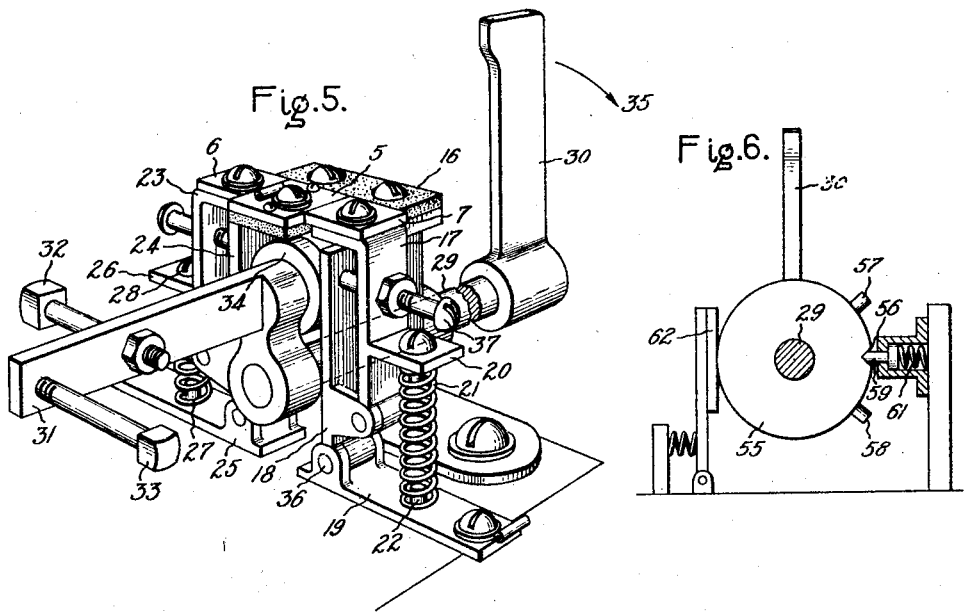
Fig.5.
Fig.6.
Inventor:
Leonard P. Hutt,
by *Alexander S. ____*
His Attorney.

Patented Oct. 23, 1928.

1,688,715

UNITED STATES PATENT OFFICE.

LEONARD P. HUTT, OF SCHENECTADY, NEW YORK, ASSIGNOR TO GENERAL ELECTRIC COMPANY, A CORPORATION OF NEW YORK.

MOTOR-CONTROL MECHANISM.

Original application filed December 19, 1924, Serial No. 757,065. Divided and this application filed February 10, 1926. Serial No. 87,388.

This application is a division of Serial No. 757,065, filed December 19, 1924, motor control mechanism.

My invention relates to a motor control device or mechanism. More in particular it relates to a type of such mechanism which is especially adapted for use in connection with a searchlight.

Among the objects of my invention are the following: to provide a speed control device for a motor in which the variations may be produced very gradually so that the results obtained are similar to those produced by a rheostat with an infinite number of stop points and in which the resistance between the stop points is practically negligible.

By applying to a searchlight a motor equipped with a speed controller such as herein described, a beam of light from a searchlight may be fixed upon a ship or upon an airplane and the speed of the beam regulated effectively so as to follow the ship in its course with no difficulty.

Figure 1:
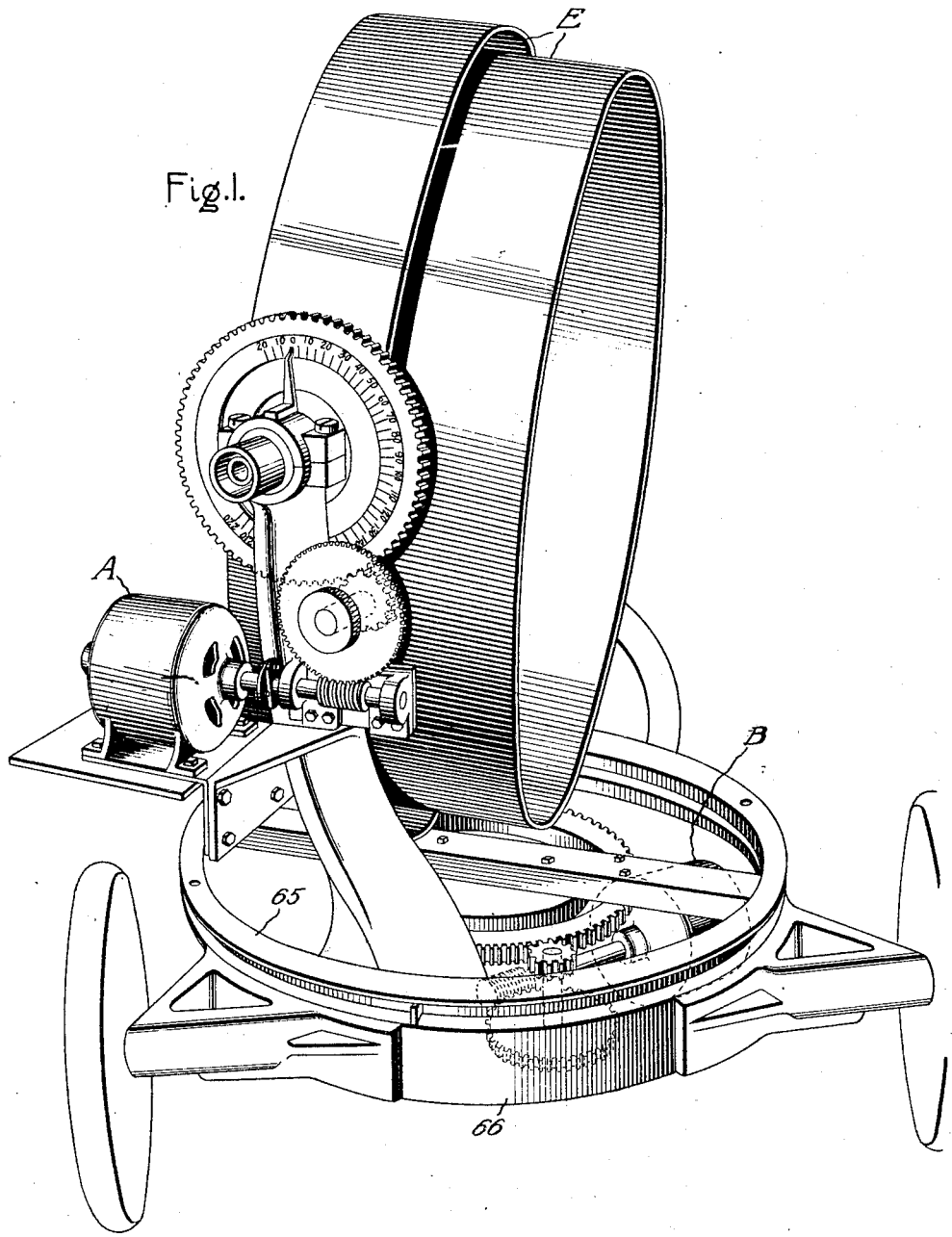
Figure 2:
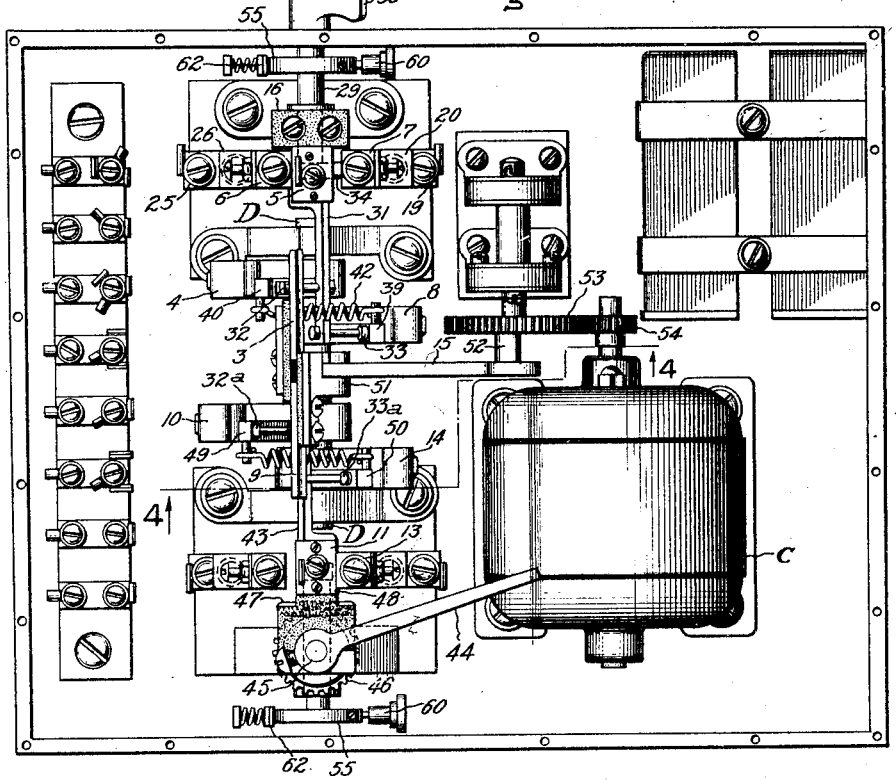
Figure 3:
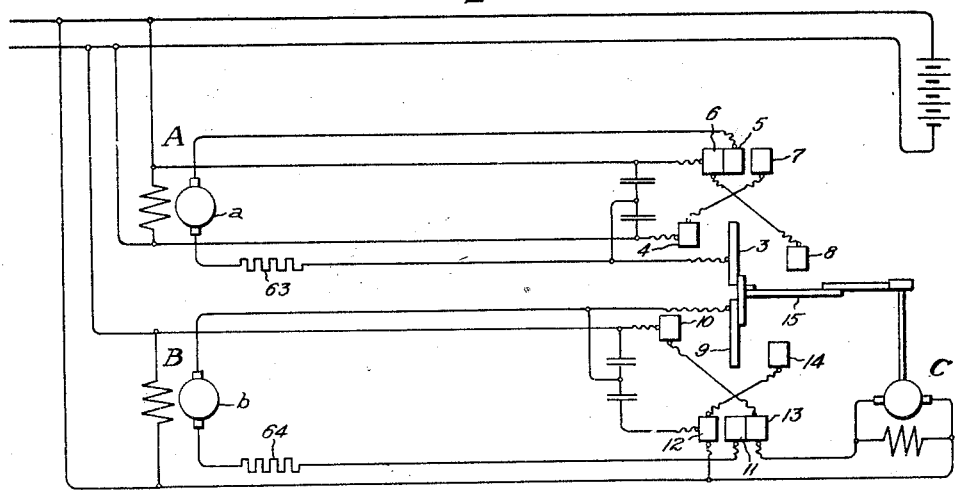

The means for accomplishing the foregoing and other useful ends are hereinafter more fully set forth and claimed, reference being had to the accompanying drawings in which Fig. 1 shows a searchlight to which my invention has been applied; Fig. 2 shows the details of the controller by means of which the speed of two motors may be effectively controlled and regulated; Fig. 3 shows the circuit of the controller of Fig. 2 in detail as applied to the two motors; Fig. 4 shows a section of the mechanism along the line 4—4 of Fig. 2 viewed in the direction indicated by the arrows in Fig. 2; and Fig. 5 shows a different part of the contact mechanism. Fig. 6 is a front view in elevation of a section of the apparatus, Fig. 2, taken across the shaft 29 and viewed in the direction of the element 30.

Referring more in detail to the drawings and in particular to Fig. 3 it will be seen that two motors A and B are provided. One of these motors, the motor A for example, is used for controlling the rotation of the searchlight about an axis at right angles to the axis of the beam, along a horizontal plane for example, and the other motor B is used for controlling the rotation of the searchlight about an axis at right angles to the first axis and to the axis of the beam, along a vertical plane for example.

The field of the motor A is shown connected directly across the power mains. The armature $a$ may be rotated in one direction or reversed. In order to rotate the motor in one direction, a circuit is established through a contact 3 which is movable and which may be carried into enagagement with the contact 4. The circuit in such a case passes through a stationary contact 5 and through another movable contact 6. The rotation of the motor may be reversed by moving contact 6 from engagement with contact 5 and closing the latter with contact 7, which latter is also movable. At the same time contact 8 must be shifted so it may be engaged by contact 3.

The same arrangement is provided in connection with the motor B in which case the contacts 9 through 13 correspond to the contacts 3 through 8 respectively.

In addition to the motor reversing means described, means are provided for regulating the speed of the motor, which means comprises a third motor C for driving a reciprocating arm 15 upon which the contacts 3 and 9 are mounted and insulated from each other. With this arrangement the circuit of the motor A is interrupted at a point between the contacts 3 and 4. The contact 4 is adjustable with respect to the contact 3 so that the time of engagement between the contacts may be varied. It will be understood that contact 4 is yieldingly supported so that contact 4 follows contact 3 during a portion or during the whole of its cycle after engagement is made with contact 4. It is found that by regulating the size of the gap between contacts 3 and 4 the speed of the motor may be effectively varied between widely diverging limits, for example, if a ratio of 200:1 is employed between the motor and the searchlight a rotation of the beam may be varied from a rate of one revolution in a few seconds to one revolution in a few hours.

In order to reverse the rotation of the motor A the relation of the contacts is reversed to a position such as that shown in connection with the motor B. The details of the means referred to may be more readily understood by referring to Figs. 2, 4 and 5. As shown in Fig. 5, the contact 5 is permanently secured to the frame of the device but suitably insulated therefrom by means of a strip of insulating material 16. Pivotally mounted on either side of the contact 5 are the contacts 6 and 7. The contact 7 is mounted on the arm 17 Fig. 5, which latter is pivoted to the support 18 which is in turn pivotally mounted on the member 19 which latter is suitably secured to the base of the device. The member 17 is provided with a projection 20 beneath which a compression spring 21 is held in place by the screw 22, made so that the member 17 may oscillate. The details of construction of the support and oscillating mechanism for the contact 6 is the same as that for contact 7. Therefore the members 23 through 28 correspond respectively to the elements 17 through 22.

For the purpose of operating the contacts 6 and 7 there is provided a shaft 29 which extends between the members 18 and 24. This shaft is provided with a control lever 30. On the opposite end of the shaft 29 there is mounted a member 31 having pins 32 and 33 projecting therefrom one on one side and the other on the opposite side. Between the elements 18 and 24 there is a projection 34 from the element 31 which serves to operate the elements 18 and 24 whenever the lever 30 is moved back and forward. For example, when the lever 30 is swung to the right as indicated by the arrow 35, the member 18 is rotated about the axis 36 which latter in turn forces the member 17 toward the right compressing the spring 21. The result is that the contact 6 advances against contact 5 and closes the circuit through the armature of the motor A, as indicated in Fig. 3. It will be seen that the member 17 is provided with an adjusting screw 37 against the forward end of which the member 18 normally rests. When the lever 30 is released the spring 21 expands and restores the member 18 to its normal position. It will be understood that in the normal position of the elements 18 and 24 that neither of the contacts 7 or 6 are in engagement with the contact 5. It is necessary to have the lever 30 displaced to the right in order to engage contact 6 or displaced to the left to engage contact 7. In one position the motor A will rotate in one direction and in the other position the motor will rotate in the opposite direction. Referring to Fig. 2, it will be seen that the contacts 4 and 8 are located in juxtaposition to the members 32 and 33 respectively on the element 31. The said contacts 4 and 8 are mounted to oscillate about the shaft D. Similarly the contacts 10 and 14 are mounted to oscillate about the shaft D. In Fig. 4 there is shown in detail how the contacts 10 and 14 are mounted. These contacts are suitably insulated from the frame of the device. For example, the contact 10 is insulated from the element 49 by an insulating plate 38, which element 49 is rotatably mounted on the shaft D. It will be seen that the contact 10 is secured to the plate 70. Furthermore, the plate 70 is suitably secured to the device by means of suitable bolts 70', which bolts, in order to preserve the insulation of the contact 10 from the frame, are also insulated from the plate 70, as for example by means of insulation washers 38'.

It will be seen that contact 14 is similarly secured to the element 50 corresponding to the element 49, which element 50 is likewise rotatably mounted on the shaft D. It will be seen also that the contact 14 is secured to a plate 14' similar to the plate 70 and similarly insulated from and secured to the element 50 through the medium of bolts 50' and insulating elements 67 and 68. It will be understood that the contacts 4 and 8 and 10 and 14 are similarly mounted upon the shaft D. By referring to Fig. 4 it will be seen that normally the contacts 10 and 14 are retained in positions corresponding to the positions of the heads 32$^a$ and 33$^a$. For example, in Fig. 4 the pin 33$^a$ is in such a position that the contact 14 is depressed to the right beyond the reach of the contact 9, whereas the contact 10 is within the reach of contact 9. The result is that when the lever 44 is thrown to the right, as indicated in Fig. 2, the contact 9 is able to engage the contact 10 and carry it to the left and out of engagement with the pin 32$^a$ in the course of the oscillation of the contact 9. It will be seen that during this operation the spring 69, which is used to normally hold the elements 49 and 50 against the pins 32$^a$ and 33$^a$ is stretched. Upon the return of the contact 9 toward the right, the spring 69 of course causes the contact 10 to pull contact 9 until the member 49 strikes the pin 32$^a$. The position at which this takes place is diagrammatically illustrated by the dotted representation of the elements 9 and 10. From this point on, contact 9 leaves the contact 10 during the rest of the oscillation. The same construction is involved in connection with contacts 4 and 8. It will be seen that in this latter construction the spring 42 corresponds to the spring 69.

In the device shown in Fig. 2 the assemblage of parts shown in Fig. 5 is present in duplicate, one of which is shown in upper part of the drawing and the other in the lower part of the drawing. The only difference is that whereas the bar 31 in the upper part of the drawing projects downwardly in the lower part of the drawing the corresponding bar 43 projects upwardly. Another difference is that whereas the control lever 30 oscillates about an axis common with the shaft 29, in the lower portion of the drawing the corresponding control lever 44 oscillates about a vertical axis on a shaft 45.

Upon the shaft 45 there is provided a bevel gear 46 which meshes with a second bevel gear 47 which latter is secured to the shaft 48 corresponding to the shaft 29. Both of the shafts 48 and 29 have a common axis of rotation. Located between these two contact mechanisms (the one comprising, of course, contacts 5, 6 and 7, Fig. 3, and the other of contacts 11, 12 and 13 of the same figure) there is the mechanism corresponding to the contacts 3, 4 and 8 and 9, 10 and 14, which mechanism comprises a shaft D of Fig. 4 upon one section of which, namely, the upper section, are mounted the contacts 4 and 8 and upon the lower section of shaft D are also mounted the contacts 10 and 14. It will be seen by referring to Fig. 2 that the bar 31 projects into the space between the elements 39 and 40 while the corresponding bar 43 of the lower section of the drawing projects into a corresponding space between the members 49 and 50, which correspond to the elements 39 and 40.

The oscillating mechanism for the contacts 3 and 9 includes an arm member 51, Fig. 2, which is mounted on the shaft D at about its central point. At the upper end of this member 51 are secured the contacts 3 and 9 which are suitably insulated from the frame.

This member 51 is connected to one end of the link 15, the other end of which is secured to a pin 52 on gear 53. This latter is driven by a gear 54 on the shaft of the motor C. When the motor is operated the member 51 is oscillated about the shaft D so that the contacts 3 and 9 oscillate back and forth between the contacts 4 and 10 on one side and 8 and 14 on the other.

When the levers 30 and 44 are in neutral position, the contacts 4, 8, 10 and 14 are in such a position that contacts 3 and 9 do not engage them. When the lever 30 is thrown to one side, as shown in Fig. 2, the motor A will begin to rotate in one direction, its speed being determined by the relative position of the contacts 3 and 4. The circuit through the armature, it will be seen, in this case passes from the line by way of contacts 6 and 5, through the armature A and the resistance 63, and finally by way of contacts 3 and 4 back to the other side of the line. It will be understood that when the contact 7 is substituted for the contact 6 in engagement with the contact 5 by reversing the position of the lever 30, the circuit through the armature is reversed, in which case the circuit passes through contacts 3 and 8 instead of through 3 and 4. The speed at which the motor rotates is determined by the distance that the lever 30 is thrown off center. If the lever 30 is reversed again the motor A will reverse and the speed of rotation is determined by the distance that the lever 30 is thrown in the opposite direction. It will be seen, therefore, that the speed of rotation of the motor A in one direction is determined by the position of the contact 8 and the reverse speed of rotation is determined by the position of the contact 4. In the latter case the circuit through the armature passes through the contacts 6 and 5 and the resistance 63, and finally by way of contacts 3 and 4 to the other side of the line. When the circuit through the armature is reversed the path of the current extends by way of contacts 3 and 8 instead of contacts 3 and 4 and contacts 7 and 5 instead of contacts 6 and 5.

The motor B will be similarly controlled through similar mechanism except that shaft 48 is controlled through the medium of the lever 44 by rotating the latter about a vertical axis instead of about a horizontal axis as in the case of the lever 30. When contact 3 engages contact 4, contact 4 is carried back with contact 3, causing the spring 42 to stretch. The contact 4 follows contact 3 to the limit of its stroke, and as contact 3 returns contact 4 will follow until the member 40 strikes the member 32, at which point contact 4 will cease to follow and contact 3 will break from it. Similarly, when the contact 9 engages the contact 10, contact 10 is carried back with contact 9 causing the spring 69 to stretch, as shown in Fig. 4. The contact 10 follows contact 9 to the limit of its stroke, as indicated in solid lines in Fig. 4, and as contact 9 returns, contact 10 will follow until the member 49 strikes the pin 32ª, at which point the contact 10 will cease to follow and contact 9 will break from it.

Referring to Fig. 1, it will be seen that the motor A is geared with the searchlight E so as to produce a rotation of the searchlight back and forth about a vertical plane. Similarly the motor B is geared with the same searchlight to cause its rotation about a vertical axis.

It will be seen, therefore, that by proper adjustment of the members 30 and 44 the motors A and B may be caused to operate so as to carry the beam from the searchlight steadily causing it to trace any desired path to enable a traveling object, such as a ship, to be held within the beam. In order to ensure that the contact mechanism will revert to neutral position in which neither of the motors A or B rotates when the levers 30 and 44 are released, I provide on the shafts 29 and 48 a device such as that shown in Fig. 6. This device consists of a disc 55 which is mounted on the shaft, which disc is provided with an indented portion 56 and with pins 57 and 58 for limiting the stroke of the levers 30 or 44. Opposite the depression 56, when in the neutral position, I provide a pin 59 which is secured to the frame of the device, which pin is pressed forward by a spring 61.

In addition I provide a brake arrangement 62 which rests against the surface of the periphery of the disc 55 and serves to dampen its motion. With this arrangement when the lever 30 is released after being depressed to the right or left by the operator the springs 21 and 27, Fig. 5, cause the rotation of the shaft 29 and as the notch 56 passes in front of the pin 59 the disc is stopped in its neutral position with the lever 30. The dampening action of the brake 62 enables the pin 56 to effectively stop the disc 55 in its proper position. One of these centering devices is provided on the shaft 29 just inside of the lever 30. Such a device, however, may be located in any suitable position along the length of the shaft. For example, in connection with the shaft 48 the centering device is located at the lower end of the shaft.

Referring to Fig. 3, it will be observed that a resistance 63 is provided in series with the armature $a$ of the motor A. Similarly, a resistance 64 is provided in series with the armature $b$ of the motor B. The object of this resistance is to protect the armature when the motor is running very slowly or in certain instances when the armature is stopped during a period that the circuit interrupter may be closed. Such a condition may prevail when the searchlight has been rotated to the limit of its stroke. This is the case where stops are provided to limit the travel of the searchlight in its operation. For example, if it is desired that the vertical movement of the searchlight be restricted so as not to exceed an angle of 90°, stops are placed on the barrel of the searchlight in such positions so that they may strike the trunnion arms which support the barrel at the forward and back limits of a stroke. Similar stops may be provided to limit the horizontal motion of the searchlight. Such stops may be located on the turntable 65, Fig. 1, to engage suitable stops on the base 66. The effect of this resistance is to limit the maximum amount of flow through the armature to the maximum load which the armature is designed to stand. Therefore, the armature may be indefinitely greatly retarded or indefinitely brought to a standstill without any damage to the apparatus.

Whereas I have described my invention by giving a concrete illustration it will be understood that I do not wish to be limited in its application to the specific disclosure inasmuch as variations may be made without departing from the spirit of the invention or from the scope of the claims herein.

What I claim as new and desire to secure by Letters Patent of the United States, is:

1. An interrupter comprising a contact member mounted to oscillate along a given path, means for oscillating said contact, a pair of auxiliary contacts mounted each to oscillate along an independent path, each independent path having a portion thereof coincident with the path of the first contact, an adjustable member mounted in operative relation to the auxiliary contacts, resilient means for drawing both of said contacts against said adjusting member, said resilient means biasing each of said contacts in an opposite direction whereby when the adjusting member is moved both contacts may be moved simultaneously in opposite directions with respect to the first contact, the relation of said elements being such that by moving the adjusting element one of the auxiliary contacts may be brought into the path of the first contact and the other auxiliary contact removed therefrom whereby contact may be made between the first contact and one of said auxiliary contacts once during each oscillation of the first contact.

2. An interrupter comprising a contact member mounted to oscillate along a given path, means for oscillating said contact, a pair of auxiliary contacts mounted each to oscillate along an independent path, each independent path having a portion thereof coincident with the path of the first contact, an adjustable member mounted in operative relation to the auxiliary contacts, resilient means for drawing both of said contacts toward each other and toward said adjusting member, whereby when the adjusting contact is moved both contacts may be moved simultaneously, the relation of said elements being such that by moving the adjusting element one of the auxiliary contacts may be brought into the path of the first contact and the other auxiliary contact removed at the same time therefrom whereby contact may be made between the first contact and one of said auxiliary contacts once during each oscillation of the first contact, the relation of the elements being such that each time that the first contact engages the auxiliary contact the auxiliary contact is separated from the adjusting element in opposition to the resilient element and each time that the first contact recedes the auxiliary contact is restored into engagement with the adjusting contact.

3. An interrupter comprising a contact member mounted to oscillate along a given path, means for oscillating said contact, a pair of auxiliary contacts mounted each to oscillate along an independent path, each independent path having a portion thereof coincident with the path of the first contact, an adjustable member mounted in operative relation to the auxiliary contacts, resilient means for drawing both of said contacts toward said adjusting member, said resilient means biasing each of said contacts in an opposite direction whereby when the adjusting contact is moved both contacts may be moved simultaneously, the relation of said elements being such that by moving the adjusting element one of the auxiliary contacts may be brought into the path of the first contact and the other auxiliary contact removed therefrom whereby contact may be made between the first contact and one of said auxiliary contacts once during each oscillation of the first contact, said adjusting member serving as means for reversing the relation of the circuit contacts to the auxiliary contact so that the said circuit contact separated from the adjusting contact may be restored into engagement therewith and the other circuit contact may be engaged by the auxiliary circuit contact and a new circuit thereby closed, said new circuit being closed once upon each oscillation of the auxiliary contact.

4. A circuit interrupter comprising three contacts and an adjusting element, a resilient element for drawing two of said contacts toward each other and against the adjusting element, means for oscillating the third contact between the said contacts, and means for moving said adjusting element to bring either of the contacts under the control of the resilient element into engagement with the oscillating element one at a time whereby a circuit is closed with one of said contacts under the control of the adjusting element upon each oscillation of the third contact, said adjusting element also serving as means for regulating the time of engagement between the third contact and either of the contacts under its control.

5. An interrupter consisting of a pair of contacts, resilient means operating to draw said contacts toward each other, a third contact located between said first contacts, and means for causing the reciprocal operation of said third contact between said first contacts whereby the interposed contact may make continuously interrupted connection with either of said first contacts, and means for adjusting the position of either of said first contacts with respect to the interposed contact for varying the time of engagement of the interposed contact with either of the first contacts before each interruption.

In witness whereof, I have hereunto set my hand this 9th day of February, 1926.

LEONARD P. HUTT.